United States Patent
Wang

(10) Patent No.: US 10,785,361 B2
(45) Date of Patent: Sep. 22, 2020

(54) METHOD FOR CALL PROCESSING AND ELECTRONIC DEVICE

(71) Applicant: Guangdong Oppo Mobile Telecommunications Corp., Ltd., Dongguan, Guangdong (CN)

(72) Inventor: Bin Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/524,904

(22) Filed: Jul. 29, 2019

(65) Prior Publication Data

US 2020/0045159 A1 Feb. 6, 2020

(30) Foreign Application Priority Data

Jul. 31, 2018 (CN) .......................... 2018 1 0857280

(51) Int. Cl.
*H04M 1/60* (2006.01)
*H04M 1/05* (2006.01)
*H04M 1/725* (2006.01)

(52) U.S. Cl.
CPC ........... *H04M 1/6066* (2013.01); *H04M 1/05* (2013.01); *H04M 1/605* (2013.01); *H04M 1/72502* (2013.01)

(58) Field of Classification Search
CPC ............................ H04M 1/6066; H04W 76/10
See application file for complete search history.

(56) References Cited

U.S. PATENT DOCUMENTS

| | | | |
|---|---|---|---|
| 2003/0002644 A1 | 1/2003 | Guccione et al. | |
| 2003/0100274 A1 | 5/2003 | Brown | |
| 2004/0116071 A1 | 6/2004 | Hall | |
| 2009/0023417 A1* | 1/2009 | Davis | H04M 1/6066 455/403 |
| 2015/0065055 A1* | 3/2015 | Newham | H04W 52/0251 455/41.3 |
| 2015/0105022 A1 | 4/2015 | Jung | |

(Continued)

FOREIGN PATENT DOCUMENTS

| | | |
|---|---|---|
| CN | 104301823 A | 1/2015 |
| CN | 105657127 A | 6/2016 |
| CN | 106453790 A | 2/2017 |

(Continued)

OTHER PUBLICATIONS

International search report for PCT/CN2019/097999 dated Oct. 25, 2019.

(Continued)

*Primary Examiner* — Myron Wyche

(57) ABSTRACT

Provided are a method for call processing and an electronic device. The method includes the following. Voice data collected by at least two target wireless headphones of the multiple target wireless headphones are received respectively. The multiple target wireless headphones are coupled with an electronic device, and the electronic device is in a call mode. The voice data collected by the at least two target wireless headphones is sent to the other party of a call. Audio data is received from the other party and the audio data is sent to the multiple target wireless headphones respectively.

14 Claims, 2 Drawing Sheets

(56) References Cited

U.S. PATENT DOCUMENTS

2017/0041973 A1* 2/2017 Liao .................... H04W 76/10

FOREIGN PATENT DOCUMENTS

| EP | 3493643 A4 | 6/2019 |
| KR | 20070067438 A | 6/2007 |
| WO | 2018032455 A1 | 2/2018 |

OTHER PUBLICATIONS

Extended European search report for European application No. 19189064.9 dated Dec. 12, 2019.
English translation of first Office Action issued in corresponding CN application No. 201810857280.6 dated Mar. 18, 2020.

* cited by examiner

METHOD FOR CALL PROCESSING AND ELECTRONIC DEVICE

CROSS-REFERENCE TO RELATED APPLICATION

This application claims priority to Chinese Patent Application No. 201810857280.6, filed on Jul. 31, 2018, the disclosure of which is hereby incorporated by reference in its entirety.

TECHNICAL FIELD

This disclosure relates to the technical field of communications, and more particularly to a method for call processing and an electronic device.

BACKGROUND

With the rapid popularization of electronic devices (such as mobile phones, tablets, etc.), functions such as text reading, sending and receiving E-mail, social chat, watching videos, or playing games can be performed with wearable devices wirelessly coupled with the electronic devices, which improves operation convenience of the electronic devices.

SUMMARY

In a first aspect of the present disclosure, a method for call processing is provided. The method includes the following. Voice data collected by at least two target wireless headphones of the multiple target wireless headphones are received respectively. The multiple target wireless headphones are coupled with an electronic device, and the electronic device is in a call mode. The voice data collected by the at least two target wireless headphones is sent to the other party of a call. Audio data is received from the other party and the audio data is sent to the multiple target wireless headphones respectively.

In a second aspect of the present disclosure, an electronic device is provided. The electronic device is configured to be wirelessly coupled with multiple target wireless headphones. The electronic device includes a processor, a memory, a communication interface, and one or more programs stored in the memory and configured to be executed by the processor. The one or more programs include instructions for performing all or part of the operations of the first aspect of the present disclosure.

In a third aspect of the present disclosure, a non-transitory computer readable storage medium is provided. The computer readable storage medium is configured to store computer programs. The computer programs are operable with a computer to perform all or part of the operations of the first aspect of the present disclosure.

BRIEF DESCRIPTION OF THE DRAWINGS

In order to describe technical solutions of implementations of the present disclosure more clearly, the following will give a brief description of accompanying drawings used for describing implementations of the present disclosure or the related art. Apparently, accompanying drawings described below are merely some implementations of the present disclosure. Those of ordinary skill in the art can also obtain other accompanying drawings based on the accompanying drawings described below without creative efforts.

DETAILED DESCRIPTION

Figure 1:
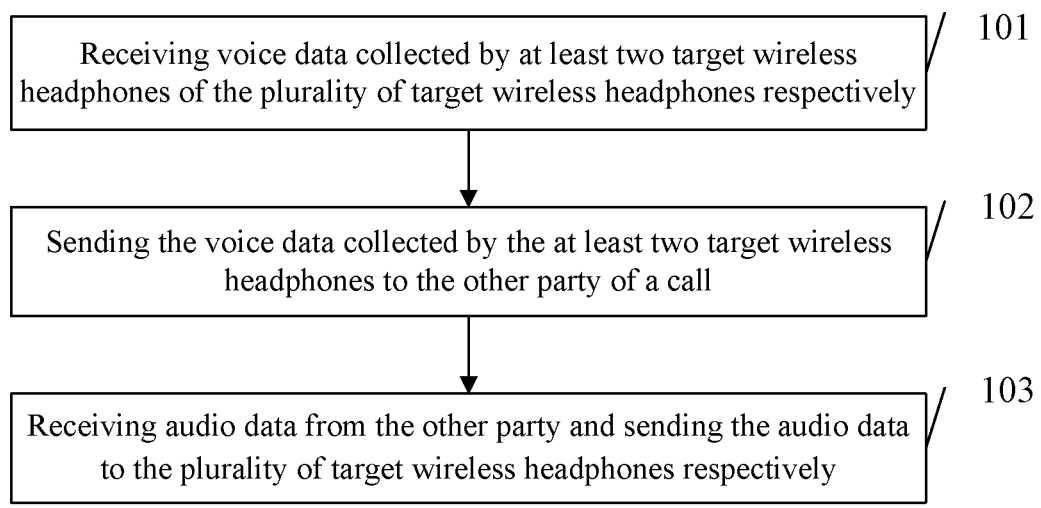
FIG. 1 is a schematic flowchart illustrating a method for call processing according to an implementation of the present disclosure.

In order for those skilled in the art to better understand technical solutions of the present disclosure, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skill in the art based on implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device referred to in implementations of the present disclosure may include various handheld devices, in-vehicle devices, wearable devices, computing devices that have wireless communication functions or other processing devices coupled with the wireless modem, as well as various forms of user equipment (UE), mobile stations (MS), terminal devices, and the like. For the convenience of description, the above-mentioned devices are collectively referred to as the electronic device.

A pair of wireless headphones referred to in implementations of the present disclosure include a left earbud and a right earbud. Either the left earbud or the right earbud can be used as a separate component.

The wireless headphone can be accommodated in a headphone case. The headphone case can include two receive cavities (i.e., a first receive cavity and a second receive cavity) and one or more headphone housing magnetic components which are disposed in the headphone case. The two receive cavities are designed for receiving a pair of wireless headphones (i.e., a left earbud and a right earbud) both in size and shape. The one or more headphone housing magnetic components are configured to attract and fix magnetically the pair of wireless headphones in the two receive cavities respectively. The headphone case can further include a cover. In terms of size and shape, the first receive cavity is designed for receiving a first wireless headphone, and the second receive cavity is designed for receiving a second wireless headphone.

The wireless headphone can include a headphone housing, a rechargeable battery (such as a lithium battery) accommodated in the headphone housing, multiple metal contacts for coupling the rechargeable battery with a charging device, and a speaker assembly including a driver unit and a directional voice port. The driver unit includes a magnetic body, a voice coil, and an isolation membrane. The driver unit is configured to make a sound from the directional voice port. The multiple metal contacts are arranged on an outer surface of the headphone housing.

In an example, the wireless headphone further includes a touch area. The touch area is located on the outer surface of the headphone housing. The touch area is provided with at least one touch sensor to detect touch operations. The touch sensor can include a capacitive sensor. When the touch area is touched by a user, at least one capacitive sensor will detect its own change in capacitance, thereby recognizing touch operations.

In an example, the wireless headphone further includes an acceleration sensor and a three-axis gyroscope. The acceleration sensor and the three-axis gyroscope are accommodated in the headphone housing to recognize a pick-up operation and a take-out operation of the wireless headphone.

In an example, the wireless headphone further includes at least one barometric pressure sensor. The barometric pressure sensor can be disposed on the outer surface of the headphone housing and is configured to detect barometric pressure in an ear after the wireless headphone is put on. Thus, tightness of the wireless headphone in a wearing state can be detected with the barometric pressure sensor. When the wireless headphone is detected to be loosely worn, the wireless headphone can send prompt information to an electronic device coupled with the wireless headphone, to remind a user that the wireless headphone has a risk of falling off.

In an example, the wireless headphone further includes a communication circuit that supports wireless communication. When the headphone case is opened and the distance between the wireless headphone and the electronic device is shorter than a connection threshold, the wireless headphone is paired with the electronic device. If the pairing is successful, the wireless headphone is wirelessly coupled with the electronic device.

Hereinafter, implementations of the present disclosure will be described in detail.

According to implementations of the present disclosure, a method for call processing and related products are provided, which can realize a group call with the other party or other parties through multiple target wireless headphones coupled with the electronic device when the electronic device establishes a call connection with the other party and thus improve user experience.

FIG. 1 is a schematic flowchart illustrating a method for call processing according to an implementation of the present disclosure. The method for call processing is applicable to an electronic device. The electronic device is configured to be wirelessly coupled with multiple target wireless headphones.

The multiple target wireless headphones include at least one pair of headphones, which can be worn on different users' heads. One user can wear one target wireless headphone or a pair of target wireless headphones, which is not limited herein.

For example, the electronic device is wirelessly coupled with a first target wireless headphone, a second target wireless headphone, and a third target wireless headphone. The first target wireless headphone and the second target wireless headphone are worn on the head of a first user, and the third target wireless headphone is worn on the head of a second user, which is not limited herein.

In implementations of the present disclosure, the manner in which the multiple target wireless headphones are wirelessly coupled with the electronic device is not limited. The multiple target wireless headphones may be wirelessly coupled with the electronic device directly, or may be wirelessly coupled with the electronic device through a relay headphone. For example, the multiple target wireless headphones include a first wireless headphone, a second wireless headphone, and a third wireless headphone. The first wireless headphone serves as the relay headphone. Then the first wireless headphone is wirelessly coupled with the electronic device, and both the second wireless headphone and the third wireless headphone are wirelessly coupled with the first wireless headphone, whereby all of the first wireless headphone, the second wireless headphone, and the third wireless headphone are wirelessly coupled with the electronic device. The term "first", "second" and "third" are used herein to distinguish one wireless headphone from another, however, the wireless headphones are the same in terms of structure even though they play different roles.

During a call, the multiple target wireless headphones send voice data to the other party of a call, and the manner in which the multiple target wireless headphones send the voice data to the other party depends on the foregoing connection relationship. For example, the multiple target wireless headphones include the first wireless headphone, the second wireless headphone, and the third wireless headphone, and each of the multiple target wireless headphones is wirelessly coupled with the electronic device directly. The first wireless headphone collects a first voice segment and sends the first voice segment to the electronic device, the second wireless headphone collects a second voice segment and sends the second voice segment to the electronic device. Then the electronic device generates voice data according to the first voice segment and the second voice segment, and sends the voice data to the other party of the call. For another example, the multiple target wireless headphones include the first wireless headphone, the second wireless headphone, and the third wireless headphone, the first wireless headphone serves as the relay headphone, and both the second wireless headphone and the third wireless headphone are wirelessly coupled with the first wireless headphone. When the second wireless headphone collects a first voice segment and sends the first voice segment to the first wireless headphone, the first wireless headphone generates voice data according to the first voice segment and a second voice segment collected by the first wireless headphone (if any) and sends the voice data to the electronic device.

In addition, during the call, the other party of the call sends audio data to the multiple target wireless headphones, and the manner in which the other party sends the audio data to the multiple target wireless headphones is inverse to the foregoing sending method. Specifically, the other party of the call sends the audio data to the electronic device, and the electronic device can send the audio data to each of the multiple target wireless headphones directly. The electronic device can also send the audio data to the relay headphone, and then the relay headphone sends the audio data to other target wireless headphones respectively. As such, a group call is realized through the multiple target wireless headphones, thereby improving privacy of the call and convenience of the group call.

In implementations of the present disclosure, the method for determining the relay headphone is not limited. In an example, priorities of the multiple target wireless headphones are predetermined, and the wireless headphone with the highest priority is selected as the relay headphone. In another example, for each of the multiple target wireless headphones, an association value between it and the electronic device or a distance between it and the electronic device is obtained, and the wireless headphone with the greatest association value or the shortest distance is selected as the relay headphone. The association value can be determined according to a usage frequency of each of the multiple target wireless headphones. The distance can be determined according to signal strength or through a built-in positioning module of the electronic device. In another example, a volume or playback time (in other word, sounding time) of each of the multiple target wireless headphones is determined, and the wireless headphone with the highest volume or the latest playback time is selected as the relay headphone. The playback time is time when a target wireless headphones collects the voice of the user.

Multiple voice segments of multiple users are received and voice data is generated according to the multiple voice segments at the relay headphone, thereby reducing the processing power consumption of the electronic device.

As illustrated in FIG. 1, the method for call processing starts with the operation at block 101.

At block 101, the electronic device receives voice data collected by at least two target wireless headphones of the multiple target wireless headphones respectively.

The multiple target wireless headphones are coupled with the electronic device, the electronic device is in a call mode.

In an implementation, before receiving the voice data collected by the at least two target wireless headphones of the multiple target wireless headphones respectively, the electronic device determines that the electronic device itself enters a call mode.

In implementations of the present disclosure, the call mode is a headphone call mode. The call may be based on a carrier (or an operator) or through instant messaging software. The call may use data traffic or wireless traffic. The call may be a voice call or a video call. In an example, the electronic device is a calling party, the other party of the call is a called party, and these two parties establish a call connection. In another example, the other party of the call is the calling party, the electronic device is the called party, and these two parties establish a call connection. When any of the above-mentioned calls is detected, it is determined that the electronic device enters the call mode.

The electronic device is wirelessly coupled with multiple waiting wireless headphones that will be used for a call. The multiple waiting wireless headphones include the multiple target wireless headphones. The method further includes the following.

Example 1

The electronic device is the calling party and the other party of the call is the called party, the electronic device sends a call request to the other party and the multiple waiting wireless headphones, and if the electronic device receives a connection acknowledgment (CONNACK) in response to the call request from the other party and a connection acknowledgment in response to the call request from one of the multiple waiting wireless headphones, the electronic device enters the call mode and the waiting wireless headphone that returns the connection acknowledgment is determined as the target wireless headphone. The calling party, also known as a caller, is a send side of a call. The called party is a receive side of a call. The connection acknowledgment is configured to inform the calling party that the called party and the one wireless headphone for a call agree to answer the call sent form the calling party.

As an example, the call request is used for requesting the called party (that is, the other party of the call) to answer the call initiated by the electronic device, and requesting the multiple waiting wireless headphones to answer the call with the other party.

The manner in which the other party of the call sends the connection acknowledgment is not limited herein. The connection acknowledgment can be sent when a touch operation on an answering component on a touch screen of the other party is detected. The connection acknowledgment can also be sent by obtaining a target voice by monitoring user's voice through a voice assistant, generating the connection acknowledgment according to the target voice and sending the connection acknowledgment to the electronic device.

The manner in which the waiting wireless headphone sends the connection acknowledgment is not limited herein. The connection acknowledgment can be generated when a touch operation on the waiting wireless headphone is detected, or a user's expression, action, and the like is detected. If at least one of the touch operation, the user's expression, and the user's action satisfies a certain condition, the connection acknowledgment is generated and sent to the electronic device.

After the electronic device sends the call request to the other party, if the user of the other party allows to establish a connection with the electronic device, the other party returns the connection acknowledgment to the electronic device, thereby establishing the call connection between the electronic device and the other party. Since the electronic device is coupled with the multiple waiting wireless headphones, the electronic device also sends the above-mentioned call request to the multiple waiting wireless headphones, and determines a waiting wireless headphone which responds to the call request as the target wireless headphone. A group call can be realized through the target wireless headphones and the electronic device, which improves privacy of the call and convenience of group call.

The target wireless headphones may be all the waiting wireless headphones coupled with the electronic device, or may be some of the waiting wireless headphones designated by the user to answer the call, which is not limited herein.

As an example, in addition to identification information of the other party of the call the call request further includes identification information of each of the multiple waiting wireless headphones. The electronic device sends the call request to the other party and the multiple waiting wireless headphones as follows. The electronic device sends the call request to the other party according to the identification information of the other party and to the multiple waiting wireless headphones according to the identification information of each of the multiple waiting wireless headphones.

The identification information of the other party may be a phone number of the other party, or the name of the other party recorded in the electronic device, such as a name in an address book or a noted name. The identification information of the wireless headphone may be a physical identifier of the wireless headphone, a network identifier of a network that the wireless headphone accesses, the name of the wireless headphone recorded in the electronic device, or identity information of the user wearing the wireless headphone, which is not limited herein.

If the identification information of the wireless headphone is the identity information of the user wearing the wireless headphone, the method for acquiring the identity information of the user wearing the wireless headphone is not limited. For example, the wireless headphone has a microphone, voice data of the user is collected through the microphone, and the identity information of the user is determined according to the voice data. For another example, the wireless headphone has a fingerprint recognition module, fingerprint data of the user is collected through the fingerprint recognition module, and the identity information of the user is determined according to the fingerprint data. Still another example, the wireless headphone has a brain wave sensor, brain wave data of the user is acquired through the brain wave sensor, and the identity information of the user is determined according to the brain wave data. When the wireless headphone is paired with the electronic device, the identity information of the user is determined according to the pairing information.

The manner in which the call request is generated is not limited herein. For example, an item corresponding to the waiting wireless headphone may be selected from a list of a connected wireless headphones stored in the electronic device, and thus the identification information of the waiting wireless headphone can be determined. The phone number of the other party is input in the dial keypad, or the phone number of the other party is searched in an address book or a call record. The call request is generated according to the phone number of the other party and the identification information of the waiting wireless headphone. For another example, voice information is input into the electronic device, and the identification information of the multiple waiting wireless headphones and a receiving party is determined as the other party according to the voice information, and thus the call request is generated. The voice content may be, for example, "dialing xxx (the phone number of the other party) with the first wireless headphone and the second wireless headphone" or "calling yyy (the user name of the other party recorded in the electronic device) with the first wireless headphone and the second wireless headphone".

After the electronic device sends the call request to the other party of the call and the multiple waiting wireless headphones, if the other party allows establishing the connection with the multiple waiting wireless headphones through the electronic device, the other party returns the connection acknowledgment to the electronic device, thereby establishing the call connection with the electronic device. If one of the multiple waiting wireless headphones allows accessing the call with the other party, such waiting wireless headphone is determined as the target wireless headphone, and the target wireless headphone returns to the electronic device the connection acknowledgment in response to the above-mentioned call request. In this way, the group call is realized through the target wireless headphone and the electronic device, thereby improving privacy of the call and convenience of the group call.

Example 2

As an example, the method further includes the following. When the other party is the calling party and the electronic device is the called party, the electronic device receives a call connection request from the other party and forwards the call connection request to the multiple waiting wireless headphones, and if the electronic device receives from any one of the multiple waiting wireless headphones a connection acknowledgment in response to the call connection request, the electronic device enters the call mode, and determines the waiting wireless headphone that returns the connection acknowledgement as the target wireless headphone.

As an example, the call connection request is used for requesting the called party (that is, the electronic device) to answer the call sent by the calling party (that is, the other party). The connection acknowledgment herein is configured to inform the electronic device that the one wireless headphone for a call agrees to answer the call sent form the calling party.

The electronic device receives the call connection request from the other party, and forwards the call connection request to the multiple waiting wireless headphones. If any one of the multiple waiting wireless headphones responds to the call connection request, such waiting wireless headphone is determined as the target wireless headphone and is able to make a call to the other party through the electronic device. When there are multiple target wireless headphones, a group call can be realized, which improves privacy of the call and convenience of the group call.

The call connection request carries multiple pieces of identification information in addition to the identification information of the electronic device and is used for requesting to establish a connection with respective waiting wireless headphones corresponding to each of the multiple pieces of identification information. For the content in the identification information and the method for acquiring the identification information, reference can be made to the previous description, which will not be repeated herein.

In short, the electronic device sends the call request to the multiple waiting wireless headphones according to the identification information of each of the multiple waiting wireless headphones.

The electronic device receives the call connection request from the other party of the call, determines the multiple waiting wireless headphones according to the multiple pieces of identification information carried in the call connection request, sends the call connection request to the multiple waiting wireless headphones, and determines the waiting wireless headphones which respond to the call connection request as the target wireless headphones. As such, the group call is realized through the target wireless headphones and the electronic device, thereby improving privacy of the call and convenience of the group call.

As an example, the method further includes the following. When the electronic device in the call mode receives a hang-up request from one of the multiple target wireless headphones, or receives an answering request from the multiple waiting wireless headphones other than the multiple target wireless headphones, the electronic device will re-determine the target wireless headphones for the call according to the hang-up request or the answering request.

In other words, when the electronic device is in the call mode, if one of the target wireless headphones wants to hang up and sends the hang-up request to the electronic device, the electronic device will no longer forward the audio data sent by the other party to the foregoing one target wireless headphone. If one of the multiple waiting wireless headphones other than the multiple target wireless headphones wants to access the call and sends the answering request to the electronic device, the electronic device will receive the voice data from the foregoing one headphone and forwards audio data sent by the other party to the foregoing one wireless headphone.

In addition, identity information of the wireless headphone that sends the answering request may be verified, that is, the identification information included in the answering request is verified. The identity information to be verified can be input on the electronic device or the target wireless headphone, and the wireless headphone can be determined as the target wireless headphone if verification of the identity information to be verified is successful. The identity information to be verified can be, for example, a verification code, a fingerprint, or an image, etc.

For wireless headphones in the multiple waiting wireless headphones other than the multiple target wireless headphones, content played in current applications can continue to be played or paused, which is not limited herein.

In implementations of the present disclosure, the voice data is a digital signal. In this case, the target wireless headphones collect sound, convert collected sound into an electrical signal and then convert the electrical signal into the voice data. In the call mode, each of target wireless headphones has a function of receiving and collecting voice data, and thus conversation between the multiple target wireless headphones and the other party can be realized.

For call implementation between the target wireless headphones and the other party, refer to the previously described method, and details will not be repeated herein.

At block 102, the electronic device sends the voice data collected by the at least two target wireless headphones to the other party of the call.

In an implementation, the electronic device sends the voice data collected by the at least two target wireless headphones to the other party of the call as follows. The electronic device obtains target voice data through data processing on the voice data collected by the at least two target wireless headphones, and sends the target voice data to the other party.

In implementations of the present disclosure, the method for processing the voice data is not limited. The method for processing the voice data may include converting a digital signal into a sound signal simply, noise processing, repeated voice processing, or voice changing which can protect the privacy of the user corresponding to the voice data.

In addition, the priority of each of the at least two target wireless headphones can be determined. The priority can be determined according to the order of sounding or a predetermined reference level. The predetermined reference level may refer to priorities specified by a user in advance. For example, the priority of the relay headphone is higher than that of any other headphone. The reference level can also be determined according to number of times the target wireless headphones are coupled with the electronic device. The reference level can also be determined by determining a priority of the user corresponding to each of the target wireless headphones and taking the priority of the user as the reference level. The method for determining the predetermined reference level of the target wireless headphones is not limited herein.

The voice data is sent to the other party after the data processing, which can improve call quality.

In an implementation, the method further includes the following after the electronic device receives the voice data collected by the at least two target wireless headphones of the multiple target wireless headphones respectively. The electronic device determines multiple answering headphones from the multiple target wireless headphones and sends the voice data to the multiple answering headphones. The multiple target wireless headphones includes the at least two target wireless headphones, the multiple answering headphones, and other wireless headphones. Since the voice data is collected by the at least two target wireless headphones and the users of the other wireless headphones may hear conversation in the voice data, the voice data collected by the at least two target wireless headphones do not need to be forwarded to the at least two target wireless headphones and the other wireless headphones. The voice data collected by the at least two target wireless headphones only needs to be forwarded to the multiple answering headphones.

In implementations of the present disclosure, the method for determining the answering headphones is not limited. In an implementation, the at least two target wireless headphones include a reference wireless headphone, and the electronic device determines the multiple answering headphones from the multiple target wireless headphones as follows. For each of the multiple target wireless headphones other than the at least two target wireless headphones, the electronic device determines a first distance between it and the reference wireless headphone to obtain multiple first distances, determines a playback volume thereof to obtain multiple playback volumes, determines a call volume of the voice data, and determines the multiple answering headphones according to the multiple first distances, the multiple playback volumes, and the call volume.

As an example, the playback volume of each of the plurality of target wireless headphones other than the at least two target wireless headphones is a volume at which the each of the plurality of target wireless headphones other than the at least two target wireless headphones plays current contents. A call volume is a volume at which the users of the at least two target wireless headphones speak when the voice data is collected by the at least two target wireless headphones.

Since the multiple target wireless headphones are wirelessly coupled with the electronic device and a distance between each of the multiple target wireless headphones and the electronic device is less than a threshold, a distance between any two of the multiple target wireless headphones is also less than a threshold. When users corresponding to the at least two target wireless headphones speak, the at least two target wireless headphones collect corresponding voice data, and contents of in the voice data can be heard by users of other headphones without being forwarded to these headphones.

As an implementation, the multiple answering headphones are determined according to the distance between the calling headphone and each of the multiple target wireless headphones other than the calling headphone, playback volume of each of the multiple target wireless headphones other than the calling headphone, and a call volume of the voice data, thereby reducing power consumption and reducing audio interference.

When the electronic device receives the voice data collected by the at least two target wireless headphones, the electronic device sends the voice data to the other party. For each of the multiple target wireless headphones other than the at least two target wireless headphones, the electronic device may determine the distance between it and the target wireless headphone and the playback volume thereof, and then determine the call quality of the voice data, thereby reducing power consumption and reducing audio interference.

At block 103, the electronic device receives audio data from the other party and sends the audio data to the multiple target wireless headphones respectively.

The other party of the call also collects voice data and sends the audio data corresponding to the voice data to the electronic device. The at least two of the multiple target wireless headphones wirelessly coupled with the electronic device can send the voice data collected to the other party, and can also receive the audio data sent by the other party of the call, thereby realizing the call between multiple users. Operations at block 103 may be performed after operations at block 101.

In an implementation, the electronic device sends the audio data to the multiple target wireless headphones respectively as follows. For each of the multiple target wireless headphones, the electronic device determines a second distance between it and the electronic device to obtain multiple second distances, determines a transmission rate thereof (each of the multiple target wireless headphones) according to each of the multiple second distances, and sends the voice data to each of the multiple target wireless headphones respectively according to the transmission rate thereof. In order to ensure synchronization of receiving the voice data by the multiple target wireless headphones, a longer second distance corresponds to a larger transmission rate. In other words, the target wireless headphone with a longer distance to the electronic device has a larger transmission rate, so that the target wireless headphone can receive the voice data simultaneously with the target wireless headphone with a shorter distance to the electronic device but a smaller transmission rate.

As an implementation, for the method for obtaining the distance between each of the target wireless headphones and the electronic device, reference can be made to the previous description, which is not repeated herein. The transmission rate is determined according to the distance between the electronic device and each of the target wireless headphones. Accordingly, the audio data can be sent to each of the target wireless headphones according to the transmission rate of each of the target wireless headphone, after the electronic device receives the audio data sent by the other party, which improves the synchronism of receiving the audio data by the multiple target wireless headphones and thus reduces delay.

The method for call processing illustrated in FIG. 1 is applicable to the electronic device. The electronic device is configured to be wirelessly coupled with the multiple target wireless headphones. The electronic device determines that the electronic device enters the call mode. The electronic device in the call mode receives the voice data collected by the at least two target wireless headphones of the multiple target wireless headphones respectively. The electronic device sends the voice data collected by the at least two target wireless headphones to the other party of the call. The electronic device receives the audio data from the other party and sends the audio data to the multiple target wireless headphones respectively. In this way, when the electronic device establishes a call connection with the other party, a group call with the other party can be implemented through the multiple target wireless headphones coupled with the electronic device, and thus user experience is improved.

Figure 2:
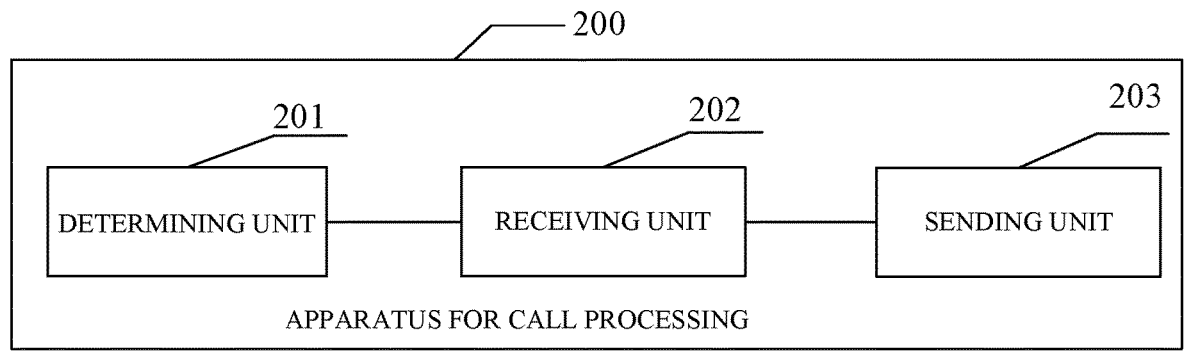
FIG. 2 is a schematic structural diagram illustrating an apparatus for call processing according to an implementation of the present disclosure.

FIG. 2 is a schematic structural diagram illustrating an apparatus for call processing according to an implementation of the present disclosure. The apparatus for call processing is applicable to an electronic device configured to be wirelessly coupled with multiple target wireless headphones. As illustrated in FIG. 2, the apparatus 200 for call processing includes a determining unit 201, a receiving unit 202, and a sending unit 203.

The determining unit 201 is configured to determine that the electronic device enters a call mode. The receiving unit 202 is configured to receive voice data collected by at least two target wireless headphones of the multiple target wireless headphones respectively when the electronic device is in the call mode. The sending unit 203 is configured to send the voice data collected by the at least two target wireless headphones to the other party of a call. The receiving unit 202 is further configured to receive audio data from the other party. The sending unit 203 is further configured to send the audio data to the multiple target wireless headphones respectively.

The determining unit 201 determines that the electronic device enters the call mode. The receiving unit 202 receives the voice data collected by the at least two target wireless headphones of the multiple target wireless headphones respectively when the electronic device is in the call mode. The sending unit 203 sends the voice data collected by the at least two target wireless headphones to the other party of the call. The receiving unit 202 further receives the audio data from the other party and the sending unit 203 further sends the audio data to the multiple target wireless headphones respectively. As such, when the electronic device establishes a call connection with the other party, a group call with the other party can be realized through the multiple target wireless headphones coupled with the electronic device, which is possible to improve user experience.

As an implementation, in terms of sending the voice data collected by the at least two target wireless headphones to the other party, the sending unit is 203 is configured to obtain target voice data through data processing on the voice data collected by the at least two target wireless headphones, and send the target voice data to the other party.

As an implementation, the determining unit 201 is further configured to determine multiple answering headphones from the multiple target wireless headphones after the receiving unit 202 receives the voice data collected by at least two target wireless headphones of the multiple target wireless headphones respectively. The sending unit 203 is further configured to send the voice data to the multiple answering headphones.

As an implementation, the at least two target wireless headphones include a reference wireless headphone. In terms of determining the multiple answering headphones from the multiple target wireless headphones, the determining unit 201 is configured to, for each of the multiple target wireless headphones other than the at least two target wireless headphones, determine a first distance between it and the reference wireless headphone, to obtain multiple first distances; determine a playback volume thereof, to obtain multiple playback volumes; determine a call volume of the voice data; determine the multiple answering headphones according to the multiple first distances, the multiple playback volumes, and the call volume.

As an implementation, in terms of sending the audio data to the multiple target wireless headphones respectively, the sending unit 203 is configured to, for each of the multiple target wireless headphones, determine a second distance between it and the electronic device, to obtain multiple second distances; determine a transmission rate thereof according to each of the multiple second distances; send the voice data to each of the multiple target wireless headphones respectively according to the transmission rate thereof.

In implementations of the present disclosure, the units can refer an application-specific integrated circuit (ASIC), a processor, a memory configured to implement one or more software or hardware programs, a integrated logical circuit, and/or other devices that can provide above functions. In addition, the above units can be implemented via the processor of terminal device illustrated in FIG. 3.

Figure 3:
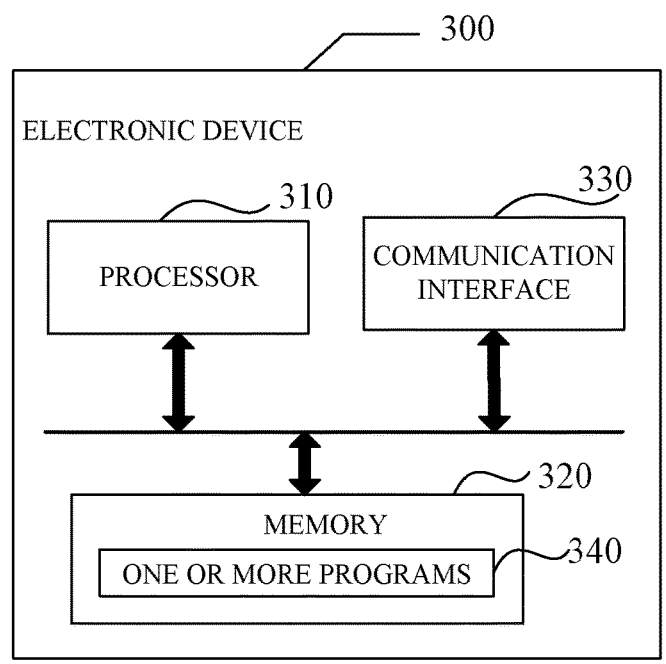
FIG. 3 is a schematic structural diagram illustrating an electronic device according to an implementation of the present disclosure.

FIG. 3 is a schematic structural diagram illustrating an electronic device according to an implementation of the present disclosure. The electronic device is configured to be wirelessly coupled with multiple target wireless headphones. As illustrated in FIG. 3, the electronic device 300 includes a processor 310, a memory 320, a communication interface 330, and one or more programs 340 stored in the memory 320 and configured to be executed by the processor 310. The one or more programs 340 include instructions operable with the processor to: determine that the electronic device enters a call mode; receive voice data collected by at least two target wireless headphones of the multiple target wireless headphones respectively when the electronic device is in the call mode; send the voice data collected by the at least two target wireless headphones to the other party of a call; receive audio data from the other party and send the audio data to the multiple target wireless headphones respectively.

The electronic device 300 determines that the electronic device 300 enters the call mode. The electronic device 300 in the call mode receives the voice data collected by the at least two target wireless headphones of the multiple target wireless headphones respectively. The electronic device 300 sends the voice data collected by the at least two target wireless headphones to the other party of the call. The electronic device 300 receives the audio data from the other party and sends the audio data to the multiple target wireless headphones respectively. As such, when the electronic device 300 establishes a call connection with the other party, a group call with the other party can be implemented through the multiple target wireless headphones coupled with the electronic device 300, and thus user experience is improved.

As an example, in terms of sending the voice data collected by the at least two target wireless headphones to the other party, the one or more programs 340 include instructions operable with the processor to: obtain target voice data through data processing on the voice data collected by the at least two target wireless headphones, and send the target voice data to the other party.

As an example, the one or more programs 340 further include instructions operable with the processor to: determine multiple answering headphones from the multiple target wireless headphones after receiving the voice data collected by the at least two target wireless headphones of the multiple target wireless headphones respectively; send the voice data to the multiple answering headphones.

As an example, the at least two target wireless headphones include a reference wireless headphone. In terms of determining the multiple answering headphones from the multiple target wireless headphones, the one or more programs 340 include instructions operable with the processor to: for each of the multiple target wireless headphones other than the at least two target wireless headphones, determine a first distance between it and the reference wireless headphone, to obtain multiple first distances; determine a playback volume thereof, to obtain multiple playback volumes; determine a call volume of the voice data; determine the multiple answering headphones according to the multiple first distances, the multiple playback volumes, and the call volume.

As an example, in terms of sending the audio data to the multiple target wireless headphones respectively, the one or more programs 340 include instructions operable with the processor to: for each of the multiple target wireless headphones, determine a second distance between it and the electronic device, to obtain multiple second distances; determine a transmission rate thereof according to each of the multiple second distances; send the voice data to each of the multiple target wireless headphones respectively according to the transmission rate thereof.

According to implementations of the disclosure, a computer storage medium is further provided. The computer storage medium is configured to store computer programs. The computer programs are operable with a computer to perform all or part of the operations of any of the methods described in the foregoing method implementations. "Computer" referred to herein includes an electronic device.

According to implementations of the present disclosure, a computer program product is further provided. The computer program product includes a non-transitory computer readable storage medium configured to store computer programs. The computer programs are operable with a computer to perform all or part of the operations of any of the methods described in the foregoing method implementations. The computer program product may be a software installation package. The computer includes an electronic device.

It is to be noted that, for the sake of simplicity, the foregoing method implementations are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software program.

The integrated unit may be stored in a computer-readable memory when it is implemented in the form of a software program and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the steps of the various methods of the implementations described above may be accomplished by means of a program to instruct associated hardware, and the program may be stored in a computer-readable memory, which may include a flash memory, a ROM, a RAM, a magnetic disk, or a CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for call processing, comprising:
    receiving voice data collected by at least two target wireless headphones of a plurality of target wireless headphones respectively, the plurality of target wireless headphones being coupled with an electronic device, the electronic device being in a call mode, wherein the at least two target wireless headphones comprise a reference wireless headphone;
    for each of the plurality of target wireless headphones other than the at least two target wireless headphones:
        determining a first distance between it and the reference wireless headphone, to obtain a plurality of first distances;
        determining a playback volume thereof, to obtain a plurality of playback volumes;
        determining a call volume of the voice data; and
        determining a plurality of answering headphones according to the plurality of first distances, the plurality of playback volumes, and the call volume;
    sending the voice data collected by the at least two target wireless headphones to the plurality of answering headphones and to the other party of a call; and
    receiving audio data from the other party and sending the audio data to the plurality of target wireless headphones respectively.

2. The method of claim 1, wherein the electronic device is a calling party and the other party is a called party, the electronic device is coupled with a plurality of waiting wireless headphones, and the plurality of waiting wireless headphones comprise the plurality of target wireless headphones; and wherein the method further comprises:
    sending a call request to the other party and the plurality of waiting wireless headphones;
    receiving connection acknowledgments in response to the call request from the other party and one of the plurality of waiting wireless headphones;
    determining that the electronic device enters the call mode; and
    determining the one of the plurality of waiting wireless headphones which returns a connection acknowledgment as a target wireless headphone.

3. The method of claim 2, wherein the call request comprises identification information of each of the plurality of waiting wireless headphones and identification information of the other party, and sending the call request to the other party and the plurality of waiting wireless headphones comprises:
    sending the call request to the other party according to the identification information of the other party; and
    sending the call request to the plurality of waiting wireless headphones according to the identification information of each of the plurality of waiting wireless headphones.

4. The method of claim 1, wherein the other party is the calling party and the electronic device is the called party, the electronic device is coupled with a plurality of waiting wireless headphones and the plurality of waiting wireless headphones comprise the plurality of target wireless headphones; and wherein the method further comprises:
    receiving a call connection request sent by the other party;
    forwarding the call connection request to a plurality of waiting wireless headphones;
    receiving a connection acknowledgment in response to the call connection request sent by one of the plurality waiting wireless headphones;
    determining that the electronic device enters the call mode; and
    determining the one of the plurality waiting wireless headphones which returns the connection acknowledgement as the target wireless headphone.

5. The method of claim 1, wherein sending the voice data collected by the at least two target wireless headphones to the other party comprises:
    obtaining target voice data through data processing on the voice data collected by the at least two target wireless headphones, and sending the target voice data to the other party.

6. The method of claim 1, wherein sending the audio data to the plurality of target wireless headphones respectively comprises:
    for each of the plurality of target wireless headphones:
        determining a second distance between it and the electronic device, to obtain a plurality of second distances;
        determining a transmission rate thereof according to each of the plurality of second distance; and
        sending the voice data to each of the plurality of target wireless headphones respectively according to the transmission rate thereof.

7. An electronic device, comprising a processor, a memory, a communication interface, and one or more programs stored in the memory and configured to be executed by the processor, and the one or more programs comprising instructions operable with the processor to:
    determine that an electronic device enters a call mode;
    receive voice data collected by at least two target wireless headphones of a plurality of target wireless headphones respectively, the plurality of target wireless headphones being coupled with the electronic device, wherein the at least two target wireless headphones comprise a reference wireless headphone;

for each of the plurality of target wireless headphones other than the at least two target wireless headphones:
  determine a first distance between it and the reference wireless headphone, to obtain a plurality of first distances;
  determine a playback volume thereof, to obtain a plurality of playback volumes;
  determining a call volume of the voice data; and
  determine a plurality of answering headphones according to the plurality of first distances, the plurality of playback volumes, and the call volume;
send the voice data collected by the at least two target wireless headphones to the plurality of answering headphones and to the other party of a call; and
receive audio data from the other party and send the audio data to the plurality of target wireless headphones respectively.

8. The electronic device of claim 7, wherein the instructions are further operable with the processor to:
  send a call request to the other party and a plurality of waiting wireless headphones, when the electronic device is a calling party and the other party is a called party, the plurality of waiting wireless headphones being coupled with the electronic device and comprising the plurality of target wireless headphones;
  receive connection acknowledgments in response to the call request from the other party and one of the plurality of waiting wireless headphones; and
  determine the one of the plurality of waiting wireless headphones which returns a connection acknowledgment as a target wireless headphone.

9. The electronic device of claim 8, wherein the call request comprises identification information of each of the plurality of waiting wireless headphones and identification information of the other party, and the instructions operable with the processor to send the call request to the other party and the plurality of waiting wireless headphones are operable with processor to:
  send the call request to the other party according to the identification information of the other party; and
  send the call request to the plurality of waiting wireless headphones according to the identification information of each of the plurality of waiting wireless headphones.

10. The electronic device of claim 7, wherein the instructions are further operable with the processor to:
  receive a call connection request sent by the other party, when the other party is the calling party and the electronic device is the called party;
  forward the call connection request to a plurality of waiting wireless headphones, the plurality of waiting wireless headphones being coupled with the electronic device and comprising the plurality of target wireless headphones;
  receive a connection acknowledgment in response to the call connection request sent by one of the plurality waiting wireless headphones; and
  determine the one of the plurality waiting wireless headphones which returns the connection acknowledgement as the target wireless headphone.

11. The electronic device of claim 7, wherein the instructions operable with the processor to send the voice data collected by the at least two target wireless headphones to the other party are operable with processor to:
  obtain target voice data through data processing on the voice data collected by the at least two target wireless headphones, and sending the target voice data to the other party.

12. The electronic device of claim 7, wherein the instructions operable with the processor to send the audio data to the plurality of target wireless headphones respectively are operable with processor to:
  for each of the plurality of target wireless headphones:
    determine a second distance between it and the electronic device, to obtain a plurality of second distances;
    determine a transmission rate thereof according to each of the plurality of second distance; and
    send the voice data to each of the plurality of target wireless headphones respectively according to the transmission rate thereof.

13. A non-transitory computer readable storage medium, configured to store computer programs, and the computer programs being operable with a computer to:
  determine that an electronic device enters a call mode;
  receive voice data collected by at least two target wireless headphones of a plurality of target wireless headphones respectively, the plurality of target wireless headphones being coupled with the electronic device, wherein the at least two target wireless headphones comprise a reference wireless headphone;
  for each of the plurality of target wireless headphones other than the at least two target wireless headphones:
    determine a first distance between it and the reference wireless headphone, to obtain a plurality of first distances;
    determine a playback volume thereof, to obtain a plurality of playback volumes;
    determining a call volume of the voice data; and
    determine a plurality of answering headphones according to the plurality of first distances, the plurality of playback volumes, and the call volume;
  send the voice data collected by the at least two target wireless headphones to the plurality of answering headphones and to the other party of a call; and
  receive audio data from the other party and send the audio data to the plurality of target wireless headphones respectively.

14. The non-transitory computer readable storage medium of claim 13, wherein the computer programs operable with a computer to send the audio data to the plurality of target wireless headphones respectively are operable with a computer to:
  for each of the plurality of target wireless headphones:
    determine a second distance between it and the electronic device, to obtain a plurality of second distances;
    determine a transmission rate thereof according to each of the plurality of second distance; and
    send the voice data to each of the plurality of target wireless headphones respectively according to the transmission rate thereof.

* * * * *